(12) United States Patent
Wang et al.

(10) Patent No.: US 8,672,559 B2
(45) Date of Patent: Mar. 18, 2014

(54) THIN CONNECTOR ASSEMBLY THAT HAS OPTICAL AND ELECTRICAL CAPABILITIES AND THAT INCLUDES A PLUG HAVING AN OPTICAL SURFACE THAT CAN BE EASILY WIPED CLEAN

(75) Inventors: Tak Kui Wang, Cupertino, CA (US); Bing Shao, Sunnyvale, CA (US); Chung-Yi Su, Fremont, CA (US)

(73) Assignee: Avago Technologies General IP Singapore Pte. Ltd., Singapore (SG)

( * ) Notice: Subject to any disclaimer, the term of this patent is extended or adjusted under 35 U.S.C. 154(b) by 395 days.

(21) Appl. No.: 13/017,080

(22) Filed: Jan. 31, 2011

(65) Prior Publication Data

US 2012/0195556 A1   Aug. 2, 2012

(51) Int. Cl.
*G02B 6/36*   (2006.01)

(52) U.S. Cl.
USPC .......................................................... 385/75

(58) Field of Classification Search
None
See application file for complete search history.

(56) References Cited

U.S. PATENT DOCUMENTS

| | | | |
|---|---|---|---|
| 5,121,454 A | | 6/1992 | Iwano et al. |
| 5,930,428 A | * | 7/1999 | Irwin et al. ....................... 385/88 |
| 6,071,015 A | * | 6/2000 | Erbse et al. ....................... 385/88 |
| 6,238,099 B1 | | 5/2001 | Le Guen et al. |
| 7,186,035 B2 | | 3/2007 | Dunn et al. |
| 2003/0174969 A1 | | 9/2003 | Vodrahalli et al. |
| 2010/0046891 A1 | * | 2/2010 | Sabo .............................. 385/74 |
| 2011/0229078 A1 | * | 9/2011 | Isenhour et al. ................ 385/33 |
| 2012/0177322 A1 | * | 7/2012 | Schwandt et al. ............... 385/53 |
| 2013/0089290 A1 | * | 4/2013 | Sloey et al. ..................... 385/74 |

FOREIGN PATENT DOCUMENTS

| EP | 0114230 A1 | * | 8/1984 |
|---|---|---|---|
| EP | 0753773 A1 | * | 1/1997 |
| FR | 2799888 A1 | | 4/2001 |

* cited by examiner

*Primary Examiner* — Mike Stahl

(57) ABSTRACT

A thin hybrid plug, a thin hybrid receptacle that mates with the thin hybrid plug, and a thin hybrid connector assembly comprising the thin hybrid receptacle mated with the thin hybrid plug are provided. A method for configuring a thin hybrid plug so that an optical surface of the plug is disposed for easy cleaning is also provided. An optics system of the hybrid plug has an optical surface that is substantially flush with an end face of a molded plug body of the hybrid plug to allow the optical surface to be easily wiped clean. In addition, the electrical contacts system and the optics system of the hybrid plug are arranged to enable the optical surface of the optics system to be easily wiped with a cleaning device, such as a cotton-tipped swab, for example. An optics system of the hybrid receptacle has an optical surface that is also disposed to be easily wiped with a cleaning device, such as a cotton-tipped swab, for example.

22 Claims, 14 Drawing Sheets

THIN CONNECTOR ASSEMBLY THAT HAS OPTICAL AND ELECTRICAL CAPABILITIES AND THAT INCLUDES A PLUG HAVING AN OPTICAL SURFACE THAT CAN BE EASILY WIPED CLEAN

TECHNICAL FIELD OF THE INVENTION

The invention relates to communications, and more particularly, to a thin connector assembly that has both optical and electrical capabilities and that has an optical surface disposed in such a way that it can be easily wiped clean.

BACKGROUND OF THE INVENTION

Electrical cables that are terminated on opposing ends with electrical plugs have long been used to interface computing devices with one another. For example, electrical cables have been used to interface desktop and laptop computers with handheld computing devices, such as mobile phones and smart phones. More recently, optical cables terminated on opposing ends with optical plugs and hybrid cables terminated on opposing ends with hybrid plugs have been used to interface computing devices with one another. Optical cables include a few optical fibers and the plugs that terminate them include optical-to-electrical (OE) and electrical-to-optical (EO) conversion circuits for converting optical signals into electrical signals, and vice versa.

Hybrid cables typically include a few electrical wires and a few optical fibers. Hybrid plugs that are used to terminate hybrid cables have both electrical contacts and optics systems. The electrical contacts of the hybrid plug are used to couple electrical signals between the ends of the electrical wires of the hybrid cable and electrical contacts of an external receptacle of an external device, such as a desktop computer, a laptop computer, a notebook computer, a mobile phone, or a smart phone. The optics system of a hybrid plug is used to couple optical signals between the ends of the optical fibers of the hybrid cable and an OE conversion circuit of the plug. The OE conversion circuit of the plug is electrically coupled to electrical circuits of the external computing device to which the plug is connected. Alternatively, the optics system of the hybrid plug may couple optical signals between the ends of the optical fibers and an optics system of an external computing device. In the latter case, the external computing device contains an OE conversion circuit for converting optical signals into electrical signals and an EO conversion circuit for converting electrical signals into optical signals. In both cases, the external computing device includes a receptacle that is configured to receive and mate with the hybrid plug.

Efforts are continuously being made in the computing industry to decrease the thicknesses of computing devices. As the thicknesses continue to decrease, the corresponding dimensions of the receptacles on the computing devices that receive the plugs also decrease. Consequently, the corresponding dimensions of the plugs must also decrease. With respect to hybrid plugs, as their dimensions decrease, the corresponding dimensions of the optical surfaces of the optics systems of the hybrid plugs must also decrease. As the dimensions of this optical surface decrease, the task of wiping off the optical surface to remove any dirt and debris becomes increasingly challenging. In addition, the optical surface is typically recessed relative to the end face of the hybrid plug, which also makes the task of wiping off the optical surface challenging. The ability to wipe off the optical surface is critical to maintaining good optical signal quality.

Accordingly, a need exists for a hybrid plug that can be made very thin and that has an optical surface that is disposed in such a way that it can be easily wiped clean. A need also exists for a thin receptacle that is configured to receive the thin hybrid plug to form a thin connector assembly.

SUMMARY OF THE INVENTION

The invention is directed to a thin hybrid plug, a thin hybrid receptacle configured to mate with the thin hybrid plug, a thin connector assembly comprising the thin hybrid plug and the thin hybrid receptacle mated together, and a method. The thin hybrid plug comprises a plug body, an electrical contact system, and an optics system. The plug body has a first side configured to be attached to an end of a cable and a second side being configured to engage a receptacle. The electrical contacts system is at least partially encapsulated in the plug body and includes at least one electrical contact portion that extends away from an end face located on the second side of the plug body in a direction that is generally normal to the end face of the plug body. The electrical contact portion is coupled to ends of electrical wires of the cable. The optics system is at least partially encapsulated in the plug body and includes an optical surface that is substantially flush with the end face of the plug body such that the end face of the plug body and the optical surface are substantially co-planar surfaces. The optics system includes at least one optical element for coupling light between at least one end of at least one optical fiber of the cable and an optics system of the receptacle.

The thin hybrid receptacle comprises a receptacle housing, an optics system mounted in the receptacle housing, and a circuit board mounted in the receptacle housing. The optics system has an end face that is disposed to be in close proximity to, or in contact with, an optical surface of an optics system of the hybrid plug when the hybrid plug is mated with the hybrid receptacle. The circuit board has at least a first electrical contact portion that is configured to electrically couple with a first electrical contact portion of the hybrid plug when the hybrid plug is mated with the hybrid receptacle.

The thin connector assembly comprises the thin hybrid plug and the thin hybrid receptacle mated together.

The method is a method for configuring a hybrid plug so that an optical surface of the plug can be easily cleaned. The method comprises providing a plug body having a first side configured to be attached to an end of a cable and a second side being configured to engage a receptacle. The plug body has an electrical contacts system at least partially encapsulated therein that includes at least one electrical contact portion that extends away from an end face located on the second side of the plug body in a direction that is generally normal to the end face of the plug body. The electrical contact portion is coupled to ends of electrical wires of the cable. An optics system is at least partially encapsulated in the plug body and includes an optical surface that is substantially flush with the end face of the plug body such that the end face of the plug body and the optical surface are substantially co-planar surfaces. The optics system includes at least one optical element for coupling light between at least one end of at least one optical fiber of the cable and an optics system of the receptacle.

These and other features and advantages of the invention will become apparent from the following description, drawings and claims.

DETAILED DESCRIPTION OF AN ILLUSTRATIVE EMBODIMENT

Embodiments of the invention are directed to a thin hybrid plug, a thin hybrid receptacle that mates with the thin hybrid plug, a thin hybrid connector assembly comprising the thin hybrid receptacle mated with the thin hybrid plug, and a method for configuring a thin hybrid plug so that an optical surface of the plug is disposed for easy cleaning. The hybrid plug has both an optics system and an electrical contacts system. Similarly, the hybrid receptacle has both an optics system and an electrical contacts system. The optics system of the hybrid plug has an optical surface that is substantially flush with an end face of a molded plug body of the hybrid plug to allow the optical surface to be easily wiped clean. In addition, the electrical contacts system and the optics system of the hybrid plug are arranged to enable the optical surface of the optics system to be easily accessed to allow it to be easily wiped with a cleaning device, such as a cotton-tipped swab, for example. Illustrative, or exemplary, embodiments of the thin hybrid plug, the thin hybrid receptacle and the thin hybrid connector assembly will now be described with reference to the figures.

Figure 1A:
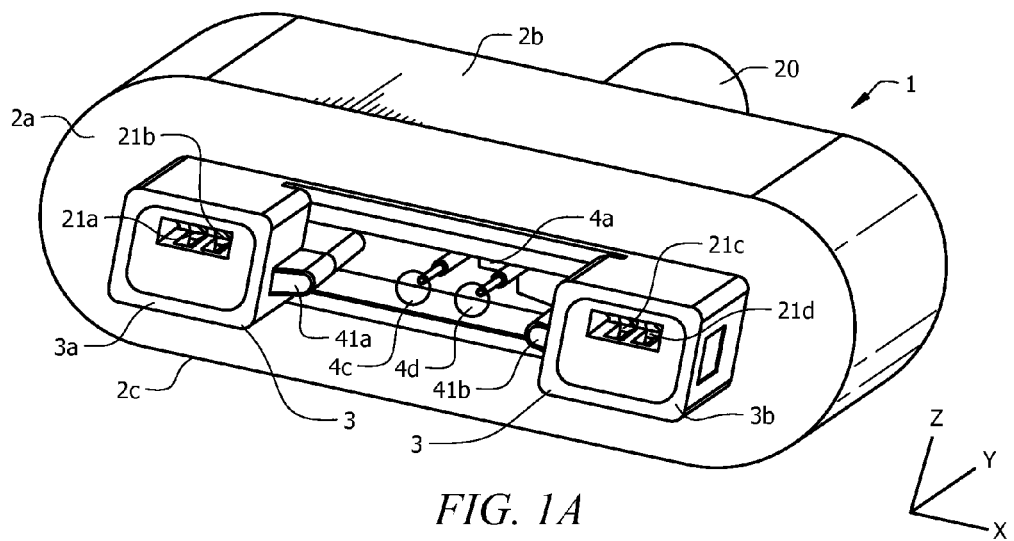
FIG. 1A illustrates a front perspective view of a thin hybrid plug in accordance with an illustrative embodiment.
Figure 1B:
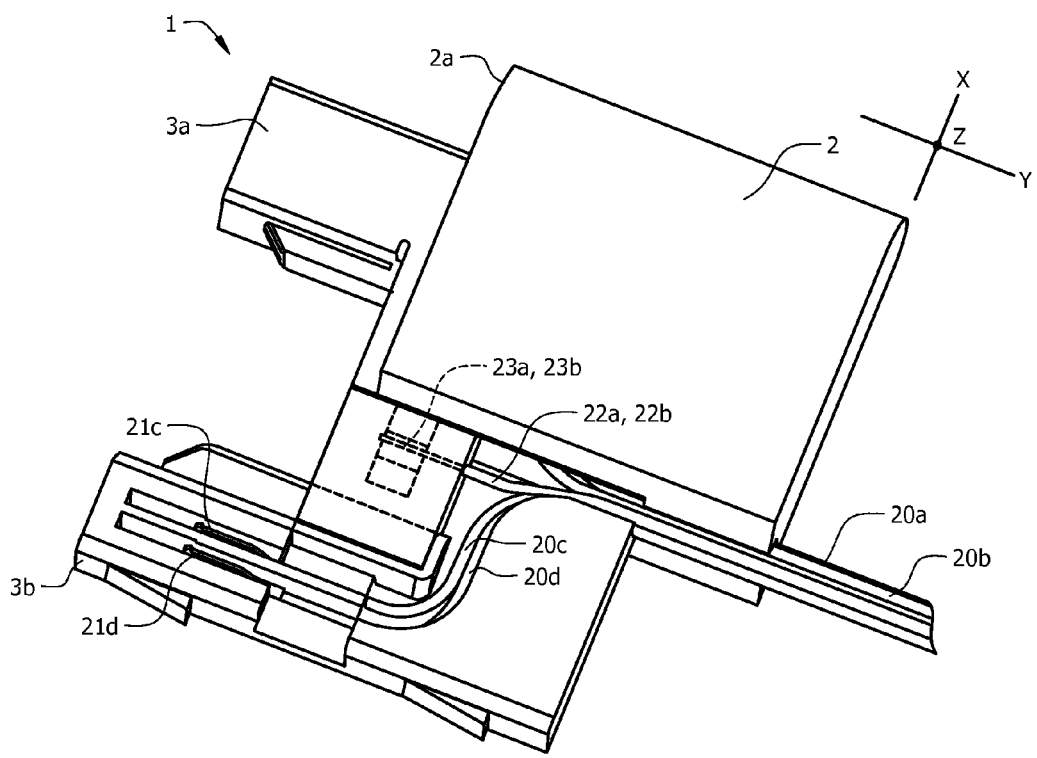
FIG. 1B illustrates a top plan view of the thin hybrid plug shown in FIG. 1A with a portion of a molded plug body of the plug removed.
Figure 2A:
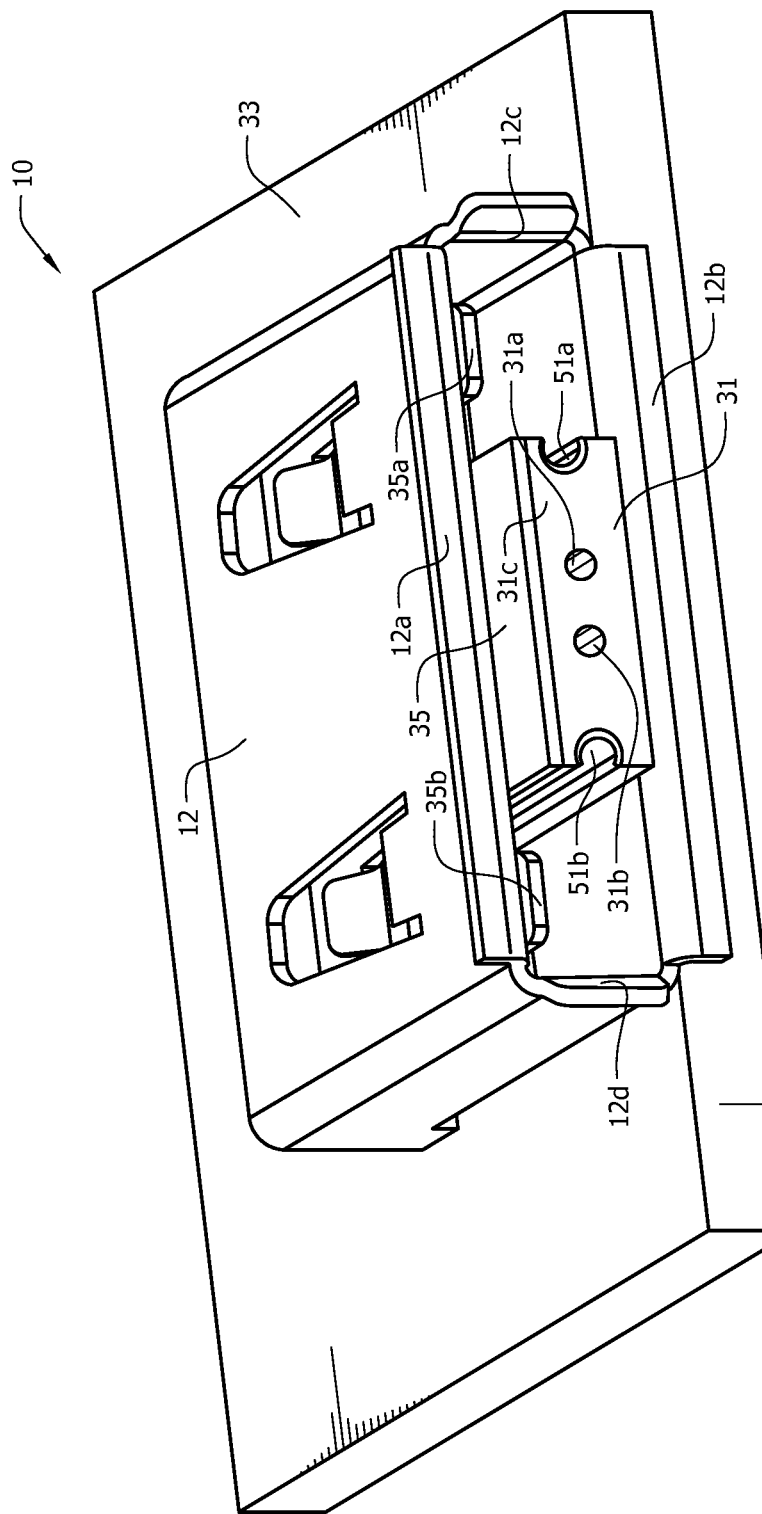
FIG. 2A illustrates a front perspective view of a thin hybrid receptacle in accordance with an illustrative embodiment.
Figure 2B:
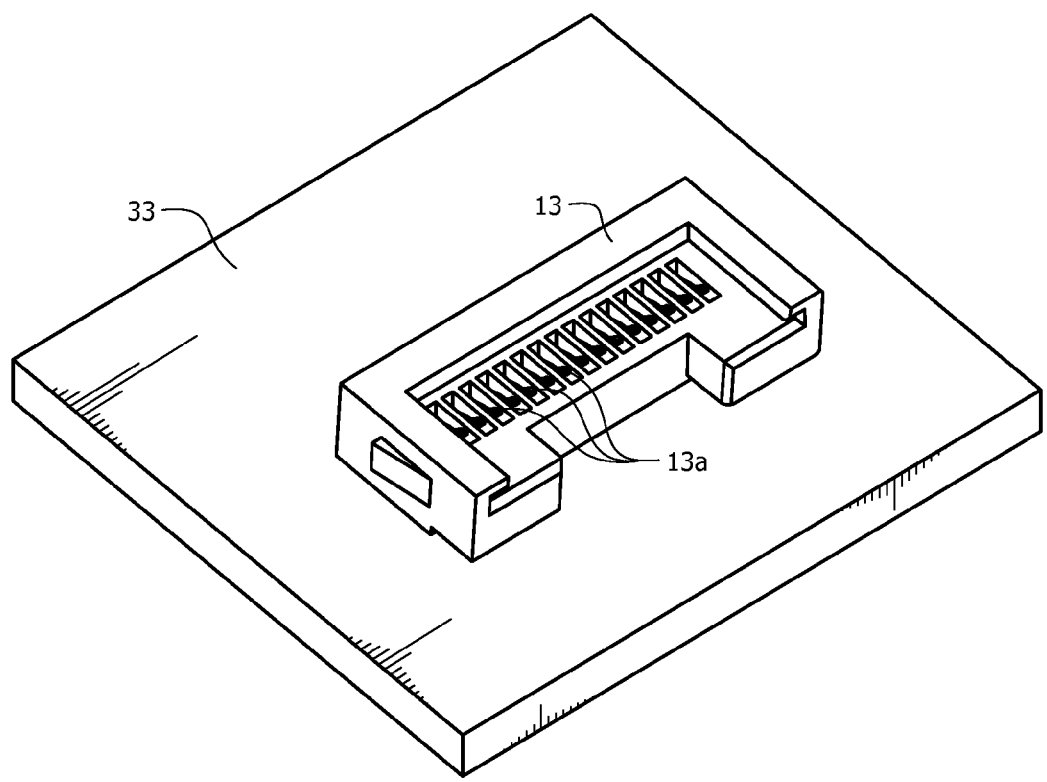
FIG. 2B illustrates a top perspective view of the thin hybrid receptacle shown in FIG. 2A with a housing of the receptacle removed to reveal an electrical contacts system of the receptacle.
Figure 3:
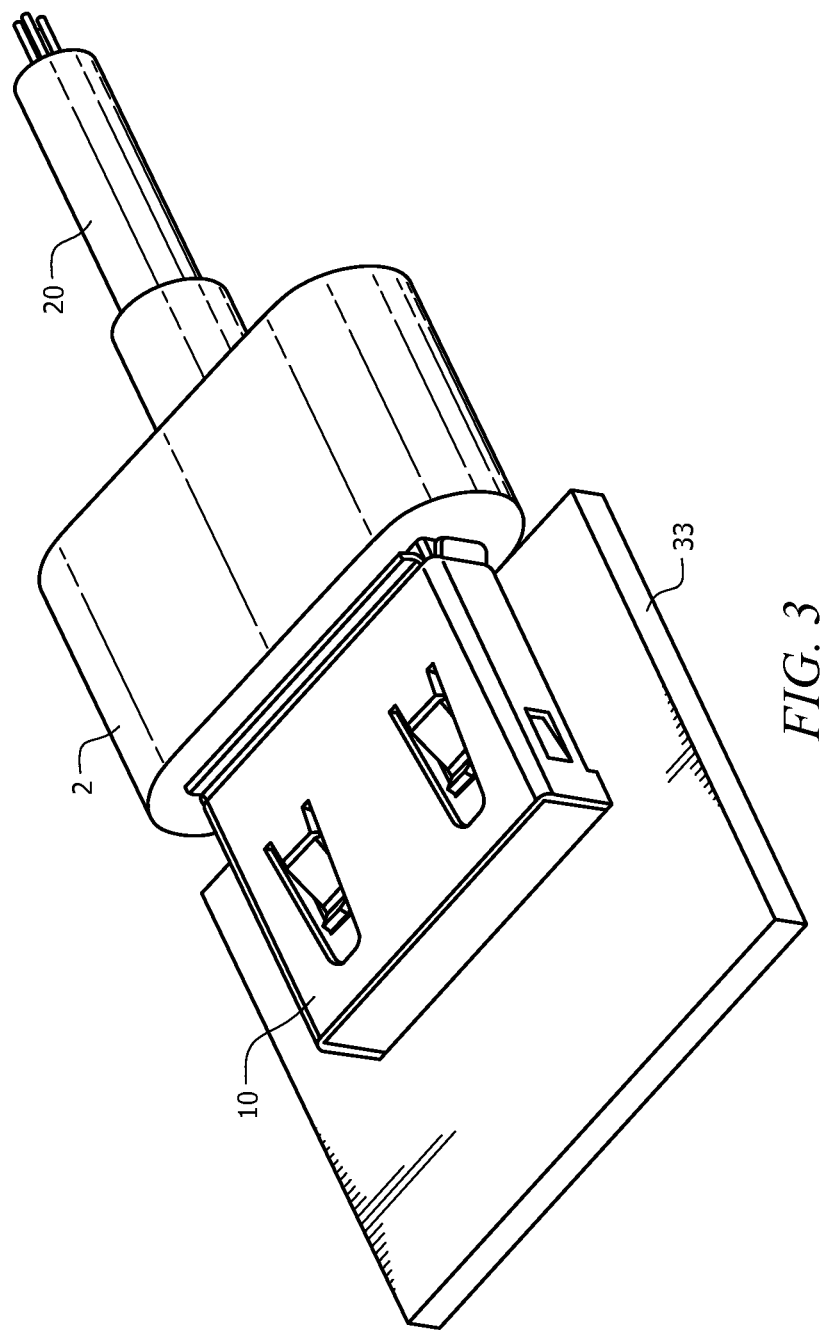
FIG. 3 illustrates a top perspective view of the thin hybrid plug shown in FIGS. 1A and 1B mated with the thin hybrid receptacle shown in FIGS. 2A and 2B, respectively, to form a thin hybrid connector assembly.

FIG. 1A illustrates a front perspective view of the thin hybrid plug 1 in accordance with an illustrative embodiment. FIG. 1B illustrates a top plan view of the thin hybrid plug 1 shown in FIG. 1A with a portion of a molded plug body 2 of the plug 1 removed. FIG. 2A illustrates a front perspective view of the thin hybrid receptacle 10 in accordance with an illustrative embodiment. FIG. 2B illustrates a top perspective view of the thin hybrid receptacle 10 shown in FIG. 2A with the receptacle housing 12 removed to reveal an electrical contacts system 13 of the receptacle 10. FIG. 3 illustrates a top perspective view of the thin hybrid plug 1 shown in FIGS. 1A and 1B mated with the thin hybrid receptacle 10 shown in FIGS. 2A and 2B, respectively, to form a thin hybrid connector assembly.

The thin hybrid plug 1 and the thin hybrid receptacle 10 in their separated and mated states will now be described in detail with reference to FIGS. 1A-3. An electrical contacts system 3 and an optics system 4 of the thin hybrid plug 1 are at least partially encapsulated in the molded plug body 2 of the thin hybrid plug 1. In accordance with this illustrative embodiment, the electrical contacts system 3 includes first and second electrical contact portions 3a and 3b. As will be described below with reference to FIGS. 7-15, the electrical contacts system may include a single electrical contact portion. In accordance with the illustrative embodiment of FIGS. 1A-3, the first electrical contact portion 3a holds ends 21a and 21b of electrical wires 20a and 20b, respectively, of a hybrid cable 20. The second electrical contact portion 3b holds ends 21c and 21d of electrical wires 20c and 20d, respectively, of the hybrid cable 20.

In accordance with this illustrative embodiment, the optics system 4 is disposed between the first and second electrical contact portions 3a and 3b. The optics system 4 has an optical surface 4a that is substantially flush with an end face 2a of the molded plug body 2. In accordance with this illustrative embodiment, the distance in the X-dimension between the outer edges of the first and second electrical contact portions 3a and 3b is about 12.2 millimeters (mm) and the distance in the Z-dimension between the upper and lower edges of the first and second electrical contact portions 3a and 3b is about 2.45 mm. The Z-dimension corresponds to the thickness of the plug 1. Thus, the plug 1 is "thin" in that the distance in the Z-dimension between an upper surface 2b of the plug 1 and a lower surface 2c of the plug 1 is small.

The end face 2a of the molded plug body 2 and the optical surface 4a of the optics system 4 generally lie in a common plane that passes through the Y-axis and that is substantially parallel to the X-Z plane. It should be noted, however, that the end face 2a and the optical surface 4a may not lie in precisely the same plane, but may be slightly offset from one another along the Y-axis such that they lie in planes that are parallel to one another, but that are slightly apart from one along the Y-axis. Therefore, while the end face 2a and the optical surface 4a may not lie in precisely the same plane, they are at least substantially co-planar. The phrase "substantially co-planar," as that phrase is used herein, means in a common plane or in two substantially parallel planes that are very close to one another along an axis that passes through both planes and that is normal to both planes.

In accordance with the illustrative embodiment, the hybrid cable 20 includes four wires 20a-20d and two optical fibers 22a and 22b. The ends 21c and 21d of the wires 20c and 20d, respectively, and the ends 23a and 23b of the optical fibers 22a and 22b, respectively, are visible in FIG. 1B. The optics system 4 of the plug 1 comprises an optically transmissive material having optical elements 4c and 4d therein for coupling optical signals between the ends 23a and 23b of the optical fibers 22a and 22b, respectively, and optical elements 31a and 31b, respectively, of an optics system 31 of the receptacle 10. While two optical elements 4c and 4d are shown, the optics system 4 may have more or less than two optical elements, depending on the number of optical fibers that are included in the cable 20.

The receptacle 10 is shown in FIG. 2A mounted on a mounting surface 33. The mounting surface 33 may be any suitable mounting surface. The receptacle 10 includes a receptacle housing 12, which includes a front opening defined by top and bottom lips 12a and 12b and sides 12c and 12d. A printed circuit board (PCB) 35 of the receptacle 10 is secured to the housing 12 and has electrical contacts (not shown) thereon. The PCB 35 has two tongue portions 35a and 35b thereon that are received within the first and second electrical contact portions 3a and 3b, respectively, of the plug 1 when the plug 1 and the receptacle 10 are in the mated state shown in FIG. 3. In the mated state, the ends 21a and 21b of the wires 20a and 20b, respectively, are in contact with the electrical contacts (not shown) disposed on the tongue portion 35a, and the ends 21c and 21d of the wires 20c and 20d, respectively, are in contact with the electrical contacts (not shown) disposed on the tongue portion 35b. The electrical contacts disposed on the PCB 35 are in contact with electrical contacts 13a of the electrical contact system 13 of the receptacle 10. In this way, electrical signals are coupled between the ends 21a-21d of the wires 20a-20d, respectively, and respective electrical contacts 13a of the electrical contacts system 13 of the receptacle 10.

When the plug 1 and the receptacle 10 are in the mated state shown in FIG. 3, the end face 2a (FIG. 1A) of the plug 1 is in abutment with one or both of the lips 12a and 12b of the receptacle housing 12 such that optical surface 4a of the optics system 4 of the plug 1 is separated by a very small air gap from the end face 31c of the optics system 31 of the receptacle 10. Thus, in the mated state shown in FIG. 3, the optical elements 4c and 4d of the optics system 4 of the plug 1 are very close to and in alignment with the optical elements 31a and 31b, respectively, of the optics system 31 of the receptacle 10. Because the electrical contact portions 3a and 3b extend along the Y-axis away from the end face 2a and away from the optical surface 4a, the optical surface 4a can be made flush with the end face 2a while still allowing the electrical and optical coupling configurations to be achieved when the plug 1 and the receptacle 10 are in the mated state shown in FIG. 3.

As can be seen in FIG. 1A, in accordance with this illustrative embodiment, the first and second electrical contact portions 3a and 3b have rails 41a and 41b, respectively, disposed on them that extend parallel to one another in directions that are normal to the optical surface 4a. As can be seen in FIG. 2A, in accordance with this illustrative embodiment, opposite sides of the optics system 31 of the receptacle 10 have first and second grooves 51a and 51b, respectively, formed therein. The rails 41a and 41b are configured to mate with the grooves 51a and 51b, respectively, when the plug 1 is mated with the receptacle 10. The combination of the engagement of the rails 41a and 41b with the grooves 51a and 51b, respectively, and the engagement of the tongue portions 35a and 35b with the first and second electrical contact portions 3a and 3b, respectively, provides mechanical coupling functions, optical alignment functions, and electrical coupling functions between the plug 1 and the receptacle 10.

As indicated above, in accordance with this illustrative embodiment, the distance in the X-dimension between the outer edges of the first and second electrical contact portions 3a and 3b is about 12.2 mm. In accordance with this illustrative embodiment, the electrical contact portions 3a and 3b are each about 2 to 3 mm wide in the X-dimension. Therefore, in accordance with this embodiment, the optical surface 4a is at least about 1 mm wide in the X-dimension. The optical surface 4a is typically at least 6 to 8 mm wide in the X-dimension. This width of the optical surface 4a is sufficient to allow a cleaning device such as a cotton-tipped swab (not shown) to be inserted between the first and second contact portions 3a and 3b to clean the optical surface 4a. The fact that the optical surface 4a is substantially flush with the end face 2a of the molded plug body 2 further facilitates cleaning of the optical surface 4a with a cleaning device. The end face 31c of the optics system 31 of the receptacle 10 is substantially flush with the front opening in the receptacle housing 12 defined by the lips 12a and 12b and by the sides 12c and 12d to allow the end face 31c to be easily cleaned with a cleaning device.

Figure 4:
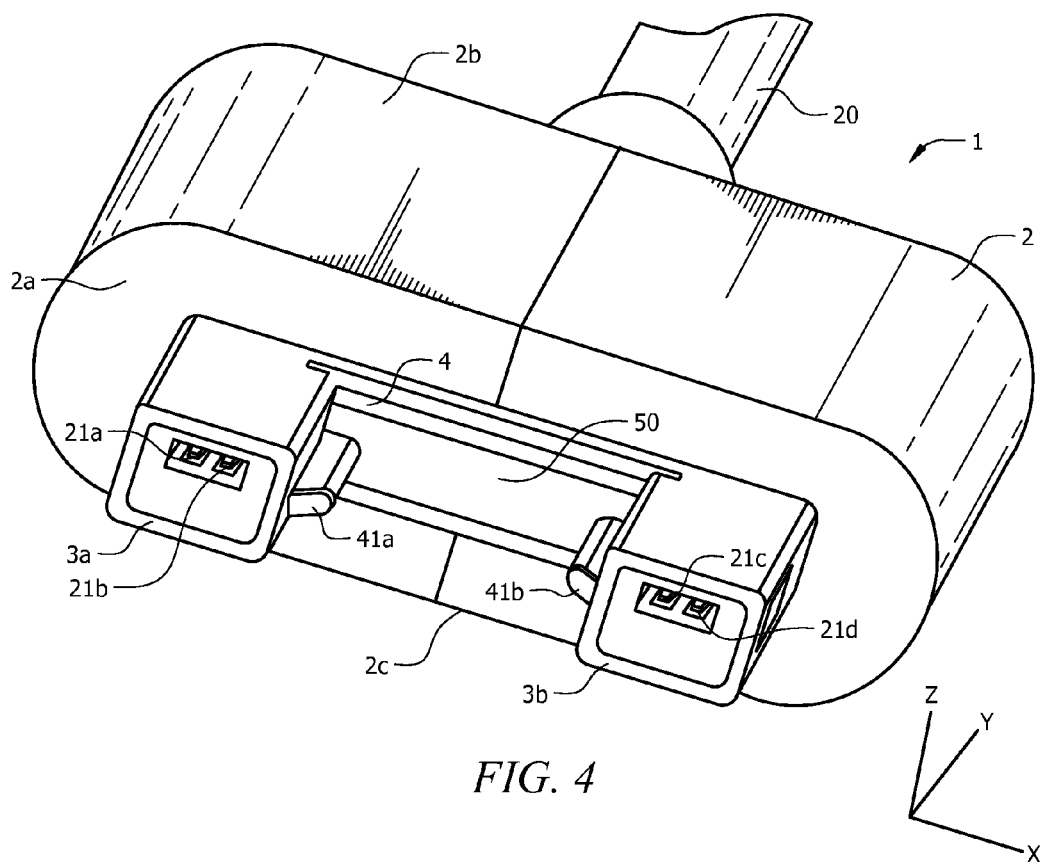
FIG. 4 illustrates a front perspective view of the thin hybrid plug shown in FIG. 1A, but further including an ambient light filter.
Figure 5:
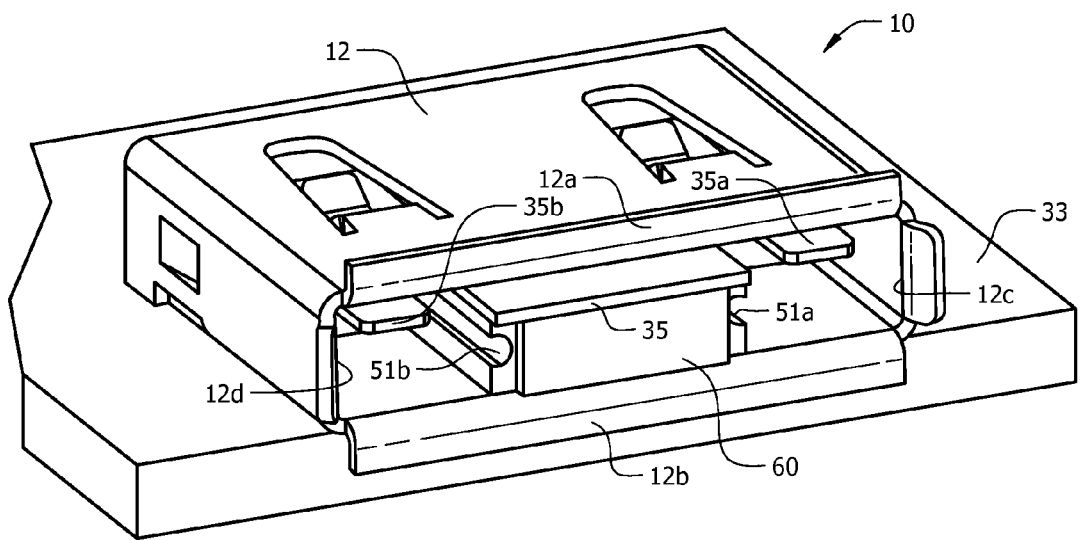
FIG. 5 illustrates a front perspective view of the thin hybrid receptacle shown in FIG. 2A, but further including an ambient light filter.
Figure 6:
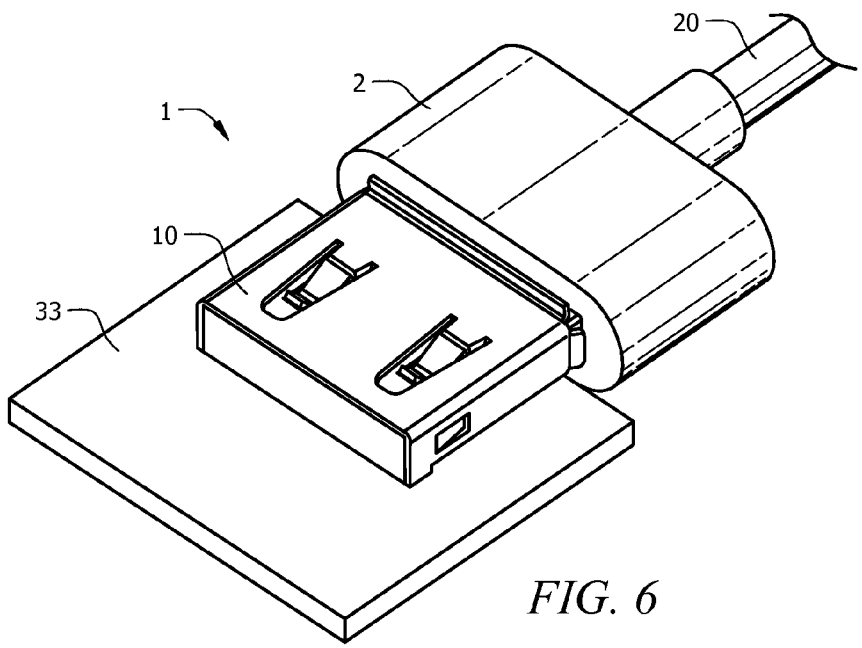
FIG. 6 illustrates a top perspective view of the thin hybrid plug shown in FIG. 4 mated with the thin hybrid receptacle shown in FIG. 5 to form the thin hybrid connector assembly.

FIG. 4 illustrates a front perspective view of the thin hybrid plug 1 shown in FIG. 1A, but further including an ambient light filter 50. FIG. 5 illustrates a front perspective view of the thin hybrid receptacle 10 shown in FIG. 2A, but further including an ambient light filter 60. FIG. 6 illustrates a top perspective view of the thin hybrid plug 1 shown in FIG. 4 mated with the thin hybrid receptacle 10 shown in FIG. 5 to form the thin hybrid connector assembly. Like numerals in FIGS. 1A-6 represent like elements or features. The filters 50 and 60 prevent ambient light from passing through the optical surface 4a and through the end face 31c, respectively. When the plug 1 is mated with the receptacle 10 in the manner depicted in FIG. 6, the lips 12a and/or 12b of the receptacle housing 12 abut the end face 2a of the plug 1 such that the filters 50 and 60 are in close proximity to one another and are separated from one another only by a small air gap. The dimensions of the plug 1 and receptacle 10 are the same as those described above with reference to FIGS. 1A-3. The filter 50 is substantially flush, i.e., co-planar, with the end face 2a of the plug 1. Thus, the filter 50 can be cleaned in the manner described above in which the optical surface 4a is cleaned using a cleaning device such as a cotton-tipped swab, for example. The filter 60 may be cleaned in the same manner.

Figure 7:
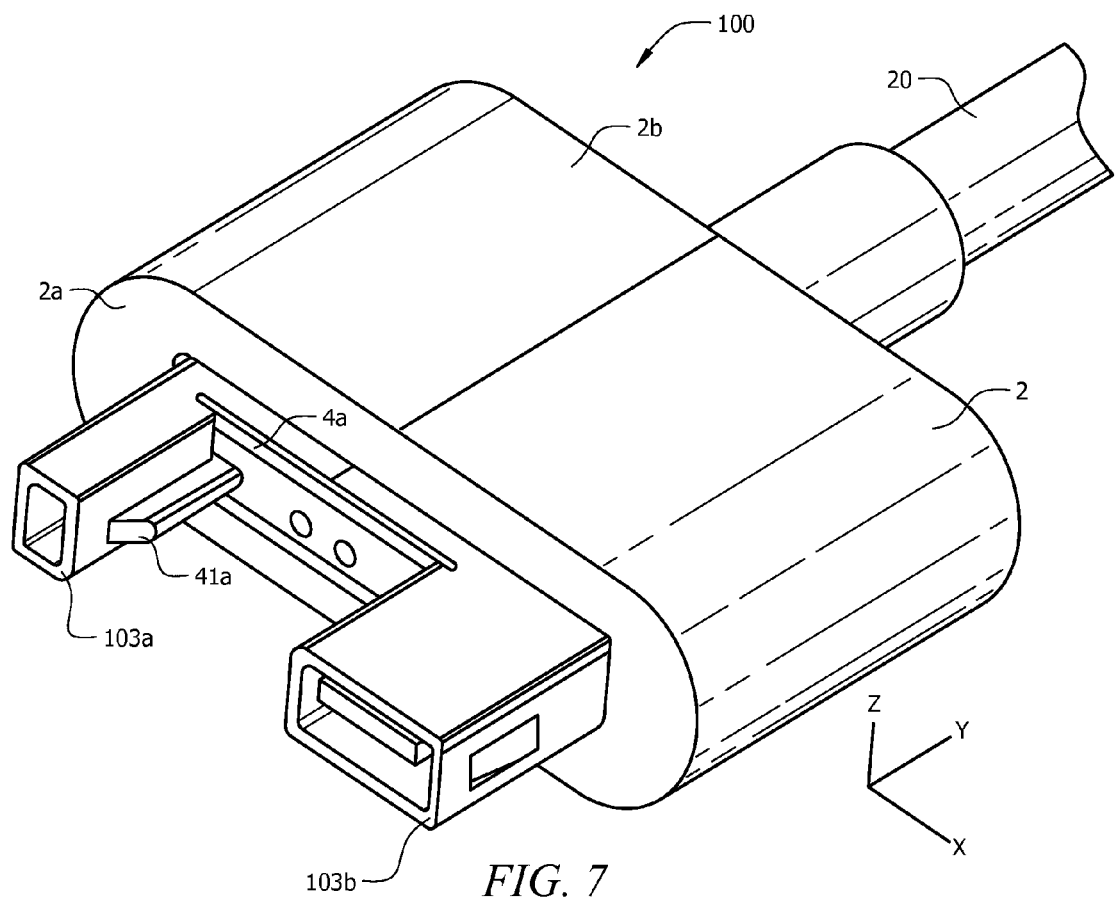
FIG. 7 illustrates a front perspective view of a thin hybrid plug in accordance with another illustrative embodiment.
Figure 8:
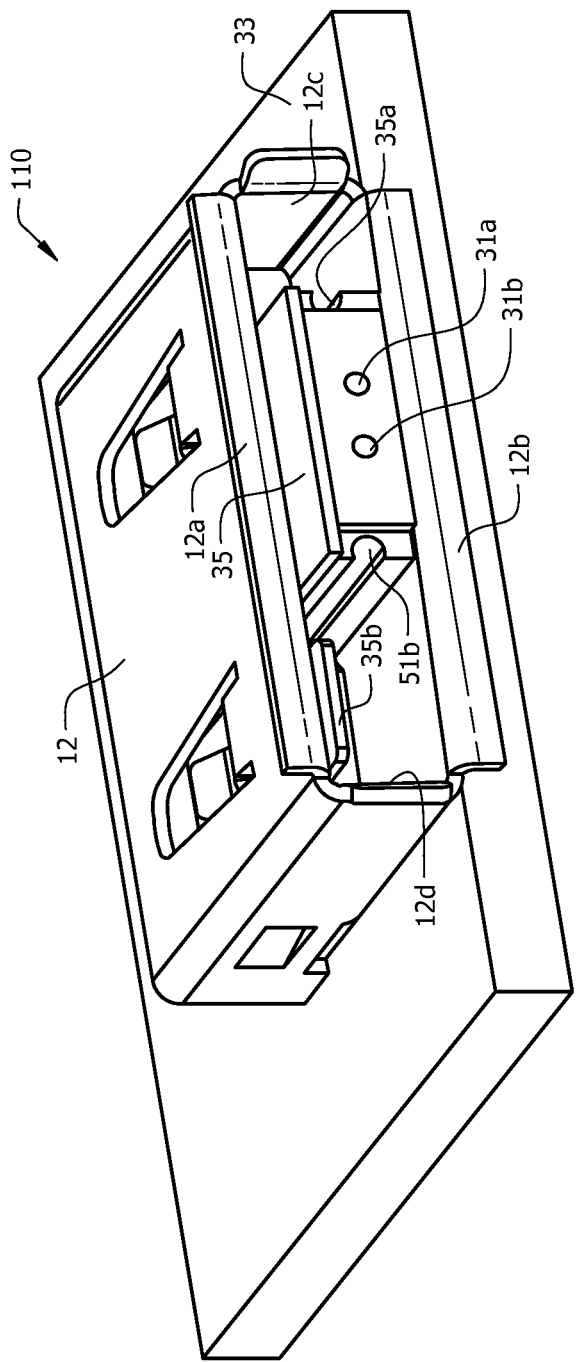
FIG. 8 illustrates a front perspective view of the thin hybrid receptacle in accordance with an illustrative embodiment that is designed to mate with the thin hybrid plug shown in FIG. 7.
Figure 9:
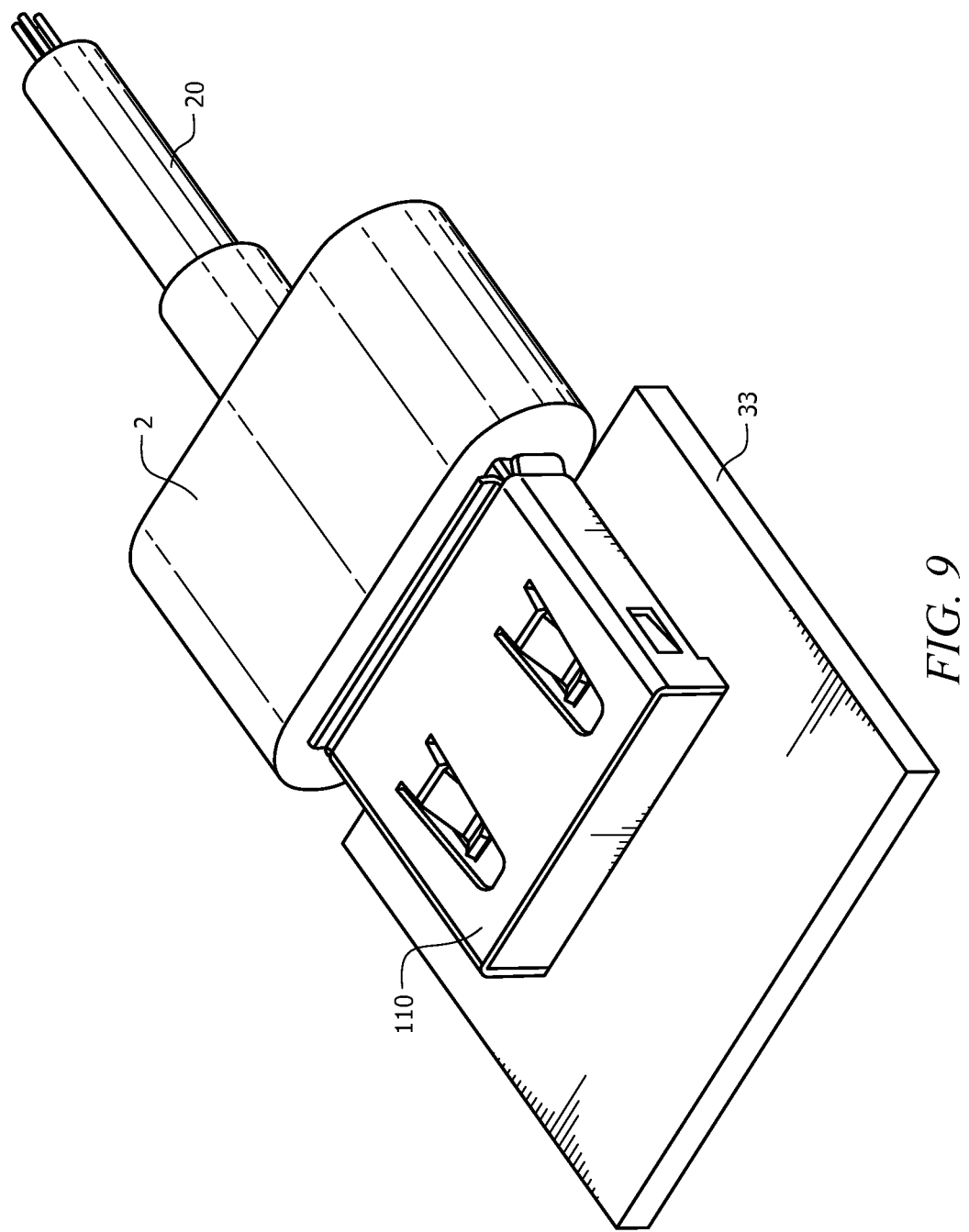
FIG. 9 illustrates a top perspective view of the thin hybrid plug shown in FIG. 7 mated with the thin hybrid receptacle shown in FIG. 8 to form a thin hybrid connector assembly.

FIG. 7 illustrates a front perspective view of a thin hybrid plug 100 in accordance with another illustrative embodiment. FIG. 8 illustrates a front perspective view of a thin hybrid receptacle 110 in accordance with an illustrative embodiment that is designed to mate with the thin hybrid plug 100. FIG. 9 illustrates a top perspective view of the thin hybrid plug 100 shown in FIG. 7 mated with the thin hybrid receptacle 110 shown in FIG. 8 to form a thin hybrid connector assembly. The plug 100 and the receptacle 110 are very similar to the plug 1 and the receptacle 10, respectively. Therefore, like reference numerals in FIGS. 1A-9 represent like elements or features.

Instead of having first and second electrical contact portions 3a and 3b, the plug 100 has a first portion 103a that performs only mechanical coupling and alignment functions and a second portion 103b that performs electrical contact functions and mechanical coupling and alignment functions. The ends of the electrical wires (not shown) of the cable 20 are disposed within the second portion 103b. None of the ends of the electrical wires (not shown) of the cable 20 are disposed within the first portion 103a. The PCB 35 of the receptacle 110 has only one tongue portion 35b, which is received within the second portion 103b of the plug 100 when the plug 100 and the receptacle 110 are mated with each other. The first tongue portion 35a shown in FIG. 2A has been removed since the first portion 135a performs no electrical contact functions, but performs only mechanical coupling and alignment functions. In all other respects, the plug 100 and the receptacle 110 are configured identically to the plug 1 and the receptacle 10, respectively, shown in FIGS. 1A-3. The plug 100 and the receptacle 110 mate with each other in the same manner in which the plug 1 and receptacle 10 mate with each other.

The optical surface 4a is substantially flush with the end face 2a, i.e., the optical surface 4a and the end face 2a are substantially co-planar surfaces. In accordance with this illustrative embodiment, the distance in the X-dimension between the outer edges of the first and second portions 103a and 103b is about 11.9 mm. In accordance with this illustrative embodiment, the optical surface 4a is at least about 1 mm wide in the X-dimension, and is typically about 6 to 8 mm wide in the X-dimension. Thus, the width of the optical surface 4a is sufficient to allow a cleaning device such as a cotton-tipped swab (not shown) to be inserted in between the first and second portions 103a and 103b in order to clean the optical surface 4a. Because the optical surface 4a is substantially flush with the end face 2a of the molded plug body 2, rather than being recessed, the optical surface 4a may be easily cleaned with a cleaning device.

Figure 10:
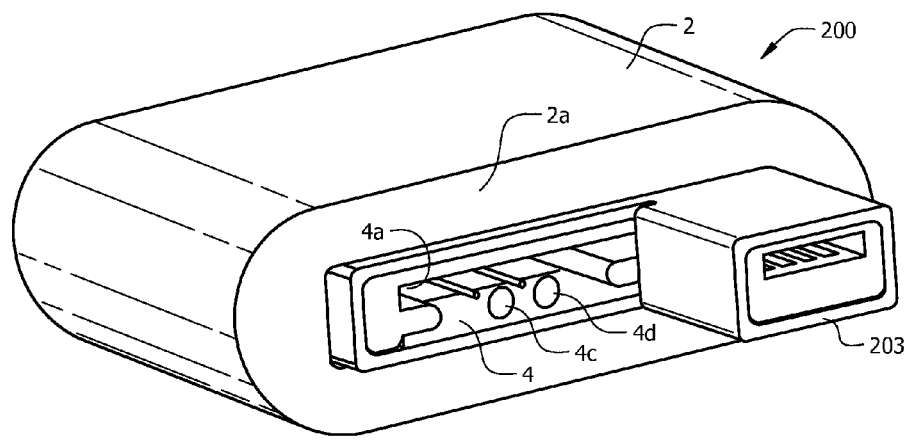
FIG. 10 illustrates a front perspective view of a thin hybrid plug in accordance with another illustrative embodiment.
Figure 11:
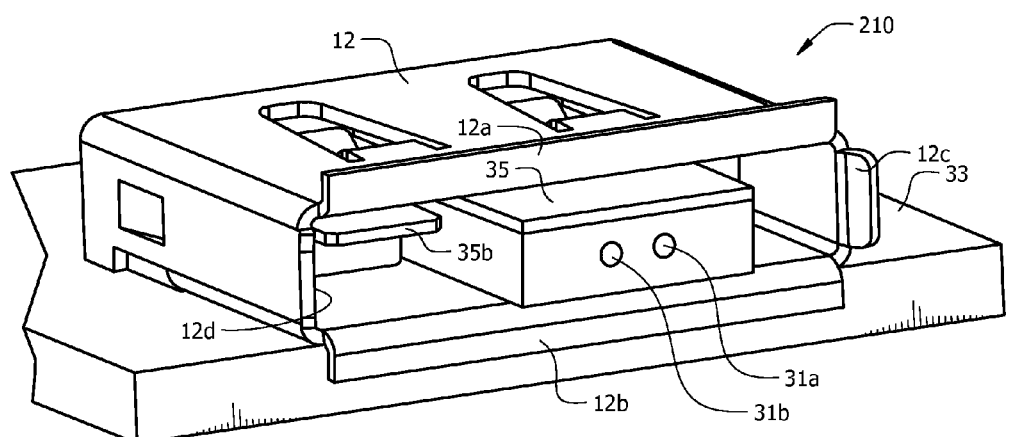
FIG. 11 illustrates a front perspective view of a thin hybrid receptacle in accordance with an illustrative embodiment that is designed to mate with the thin hybrid plug shown in FIG. 10.
Figure 12:
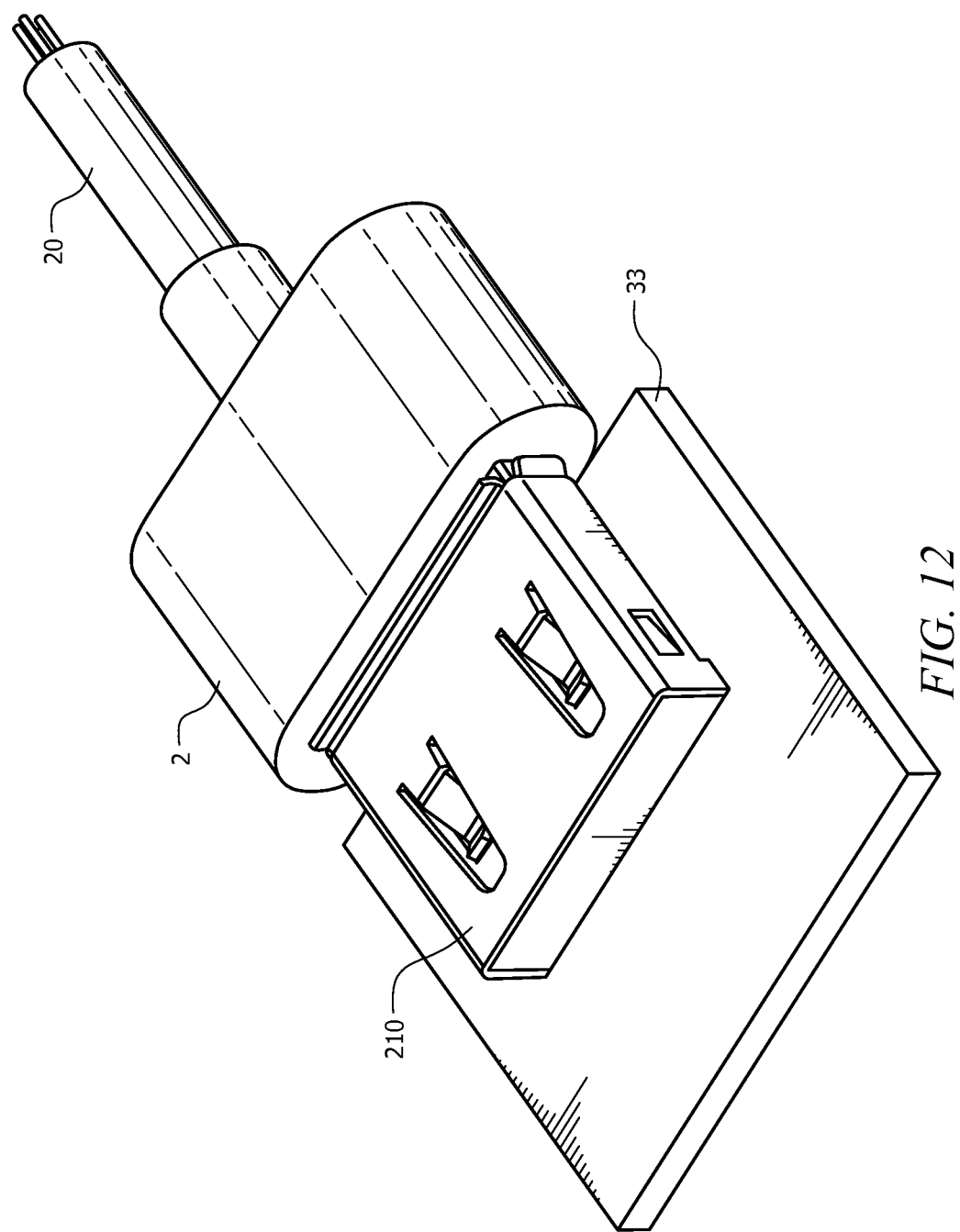
FIG. 12 illustrates a top perspective view of the thin hybrid plug shown in FIG. 10 mated with the thin hybrid receptacle shown in FIG. 11 to form a thin hybrid connector assembly.

FIG. 10 illustrates a front perspective view of a thin hybrid plug 200 in accordance with another illustrative embodiment. FIG. 11 illustrates a front perspective view of a thin hybrid receptacle 210 in accordance with an illustrative embodiment that is designed to mate with the thin hybrid plug 200. FIG. 12 illustrates a top perspective view of the thin hybrid plug 100 shown in FIG. 10 mated with the thin hybrid receptacle 210 shown in FIG. 11 to form a thin hybrid connector assembly. The plug 200 and the receptacle 210 are very similar to the plug 100 and the receptacle 110, respectively, shown in FIGS. 7-9. Therefore, like reference numerals in FIGS. 7-12 represent like elements or features.

Instead of having first and second portions 103a and 103b, the plug 200 has only one electrical contact portion 203, which performs electrical contact functions and mechanical coupling and alignment functions. The ends of the electrical wires (not shown) of the cable 20 are disposed within the electrical contact portion 203. The PCB 35 of the receptacle 210 has only one tongue portion 35b, which is received within the electrical contact portion 203 of the plug 200 when the plug 200 and the receptacle 210 are mated with each other. The first tongue portion 35a shown in FIG. 2A has been removed. In all other respects, the plug 200 and the receptacle 210 are configured identically to the plug 100 and the receptacle 110, respectively, shown in FIGS. 7-9. The plug 200 and the receptacle 210 mate with each other in the same manner in which the plug 100 and receptacle 110 mate with each other, except that the rail 41b and the groove 51b have been eliminated.

The optical surface 4a is substantially flush with the end face 2a, i.e., the optical surface 4a and the end face 2a are substantially co-planar surfaces. In accordance with this illustrative embodiment, the optical surface 4a is at least about 1 mm wide in the X-dimension, and is typically about 6 to 8 mm wide in the X-dimension. Thus, the width of the optical surface 4a is sufficient to allow a cleaning device such as a cotton-tipped swab (not shown) to be used to clean the optical surface 4a. In addition, because the optical surface 4a is substantially flush with the end face 2a of the molded plug body 2, the optical surface 4a is easier to clean with a cleaning device than it would be if it were recessed.

Figure 13:
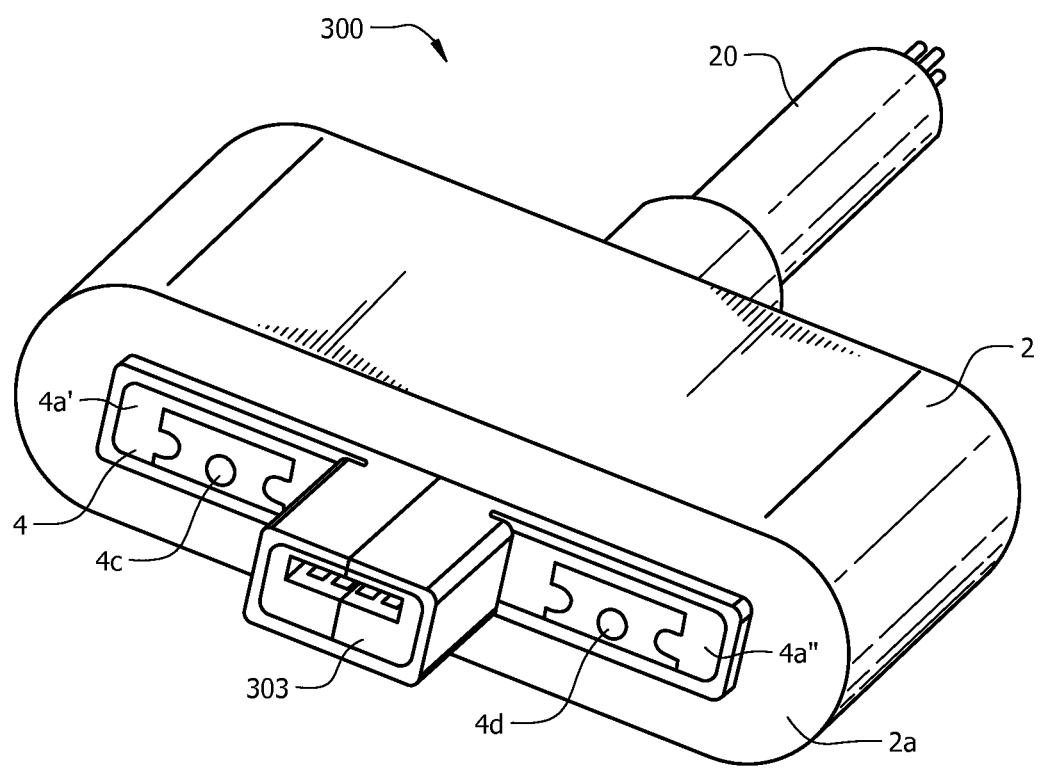
FIG. 13 illustrates a front perspective view of a thin hybrid plug in accordance with another illustrative embodiment.
Figure 14:
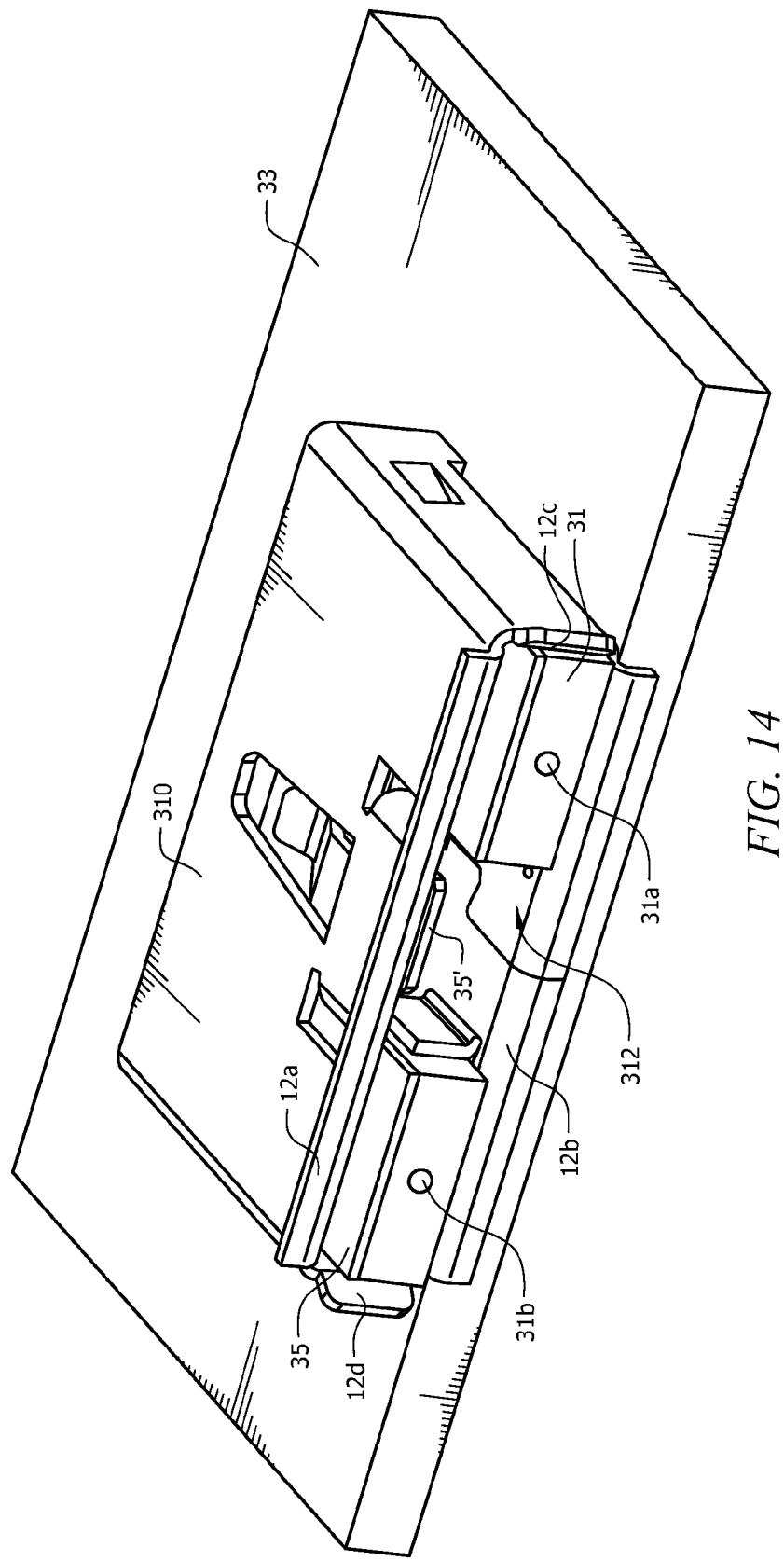
FIG. 14 illustrates a front perspective view of a thin hybrid receptacle in accordance with an illustrative embodiment that is designed to mate with the thin hybrid plug shown in FIG. 13.
Figure 15:
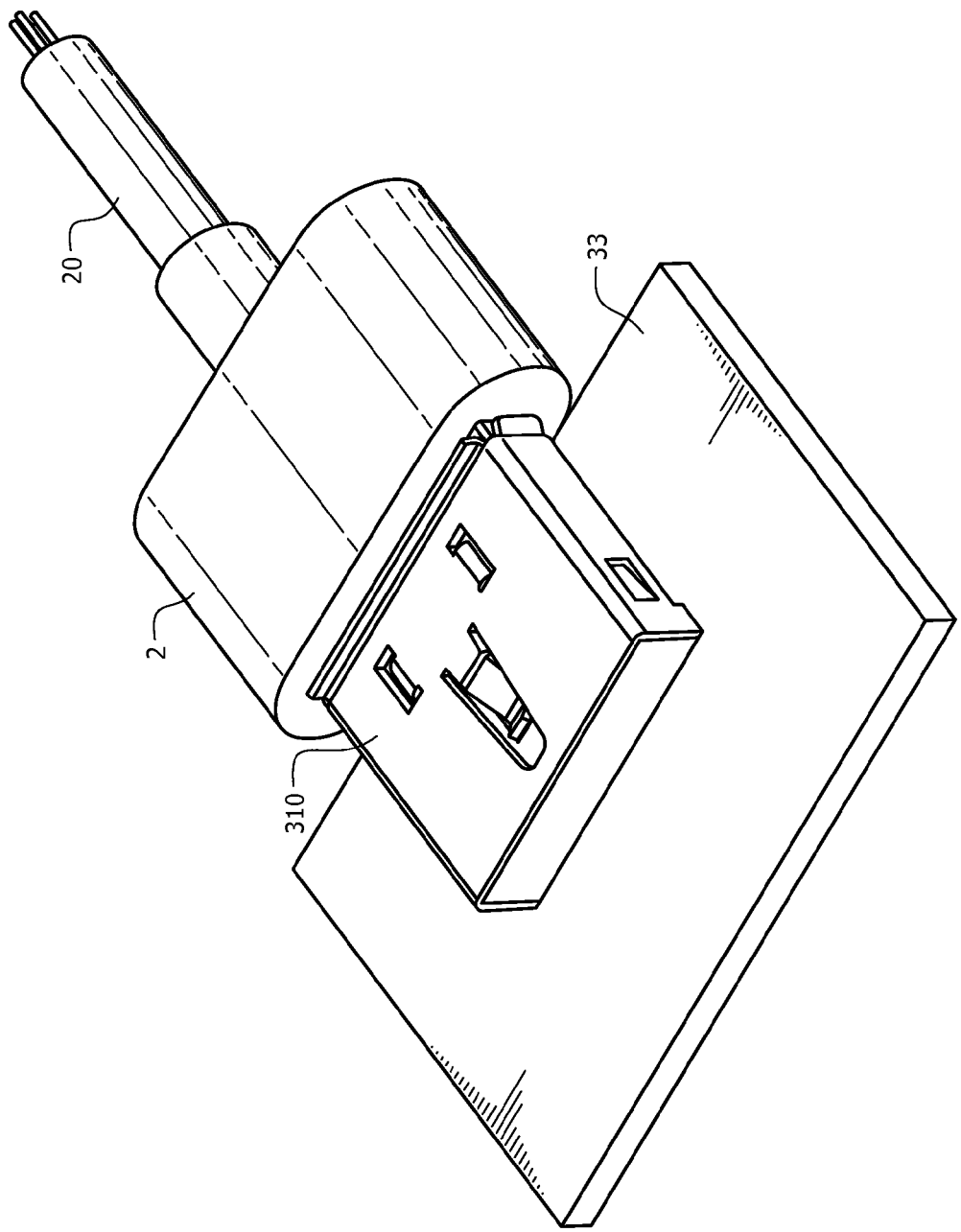
FIG. 15 illustrates a top perspective view of the thin hybrid plug shown in FIG. 13 mated with the thin hybrid receptacle shown in FIG. 14 to form a thin hybrid connector assembly.

FIG. 13 illustrates a front perspective view of a thin hybrid plug 300 in accordance with another illustrative embodiment. FIG. 14 illustrates a front perspective view of a thin hybrid receptacle 310 in accordance with an illustrative embodiment that is designed to mate with the thin hybrid plug 300. FIG. 15 illustrates a top perspective view of the thin hybrid plug 300 shown in FIG. 13 mated with the thin hybrid receptacle 310 shown in FIG. 14 to form a thin hybrid connector assembly. The plug 300 and the receptacle 310 are very similar to the plugs 100 and 200 and the receptacle 110 and 210, respectively, shown in FIGS. 7-12. Therefore, like reference numerals in FIGS. 7-15 represent like elements or features.

The plug 300 has only one electrical contact portion 303, which performs electrical contact functions and mechanical coupling and alignment functions. The ends of the electrical wires (not shown) of the cable 20 are disposed within the electrical contact portion 303. The electrical contact portion 303 is centered on the plug end face 2a. The optical surface 4a is divided into first and second optical surfaces 4a' and 4a''. The optical elements 4c and 4d of the optics system 4 of the plug 300 are disposed in the first and second optical surfaces 4a' and 4a'', respectively, on opposite sides of the electrical contact portion 303. The PCB 35 of the receptacle 310 has only one tongue portion 35', which is centered on the opening 312 of the receptacle 310. The tongue portion 35' is received within the electrical contact portion 303 of the plug 300 when the plug 300 and the receptacle 310 are mated with each other. The tongue portion 35' has electrical contacts (not shown) thereon that come into contact with the ends (not shown) of the electrical wires (not shown) of the cable 20 when the plug 300 and the receptacle 310 are in the mated state shown in FIG. 15. The optical elements 31a and 31b of the optics system 31 of the receptacle 310 are disposed on opposite ends (along the X-axis) of the optics system 31.

In the mated state shown in FIG. 15, the end face 2a of the plug 300 is in abutment with the lip 12a and/or the lip 12b of the receptacle housing 12 such that the end face 31c of the optics system 31 of the receptacle 310 and the optical surface 4a of the optics system 4 of the plug 300 are in close proximity to one another and are separated only by a small air gap. Thus, the optical elements 4c and 4d of the optics system 4 are in close proximity to and in alignment with the optical elements 31a and 31b, respectively, of the optics system 31 of the receptacle 310. Because the electrical contact portion 303 extends along the Y-axis away from the end face 2a and away from the optical surface 4a, the optical surface 4a can be made flush with the end face 2a while still allowing the electrical and optical coupling configurations to be achieved when the plug 300 and the receptacle 310 are in the mated state shown in FIG. 15. The optical surface 4a is substantially flush with the end face 2a, i.e., the optical surface 4a and the end face 2a are substantially co-planar surfaces. The optical surface 4a is at least about 1 mm wide in the X-dimension, and is typically about 6 to 8 mm wide in the X-dimension. Thus, the width of the optical surface 4a is sufficient to allow a cleaning device such as a cotton-tipped swab (not shown) to be used to clean the optical surface 4a. In addition, because the optical surface 4a is substantially flush with the end face 2a of the molded plug body 2, the optical surface 4a is easier to clean with a cleaning device than it would be if it were recessed. The end face 31c of the optics system 31 of the receptacle 310 is also substantially flush with the receptacle opening defined by the lips 12a and 12b and the sides 12c and 12d so that the end face 31c is also easy to access and clean with a cleaning device.

It should be noted that the thin hybrid plug, receptacle and connector assembly have been described herein with reference to a few illustrative embodiments in order to demonstrate the principles and concepts of the invention. For example, while the optical surface 4a of the thin hybrid plug and the end face 31c of the optics system 31 of the receptacle have been described in the mated state as being separated by an air gap, these surfaces may be in contact with each other in some embodiments, and in embodiments in which there is an air gap, the air gap may be filled with an optical material such as, for example, a refractive index matching epoxy. It will be understood by persons skilled in the art, however, that the invention is not limited to these embodiments and that these and other modifications may be made to these embodiments without departing from the scope of the invention.

What is claimed is:

1. A thin hybrid plug comprising:
   a plug body having a first side configured to be attached to an end of a cable and a second side being configured to engage a receptacle, the second side including an end face wherein the end face of the plug body lies in an X-Z plane of a Cartesian Coordinate System defined by an X-axis, a Y-axis and a Z-axis, wherein the X-axis, the Y-axis and the Z-axis are orthogonal to one another;
   an electrical contacts system at least partially encapsulated in the plug body, the electrical contacts system including at least one electrical contact portion that extends away from the end face of the plug body in a direction that is generally normal to the end face of the plug body, said at least one electrical contact portion being coupled to ends of electrical wires of the cable, said at least one electrical contact portion having a Z-axis dimension that is about 2.45 millimeters (mm); and
   an optics system at least partially encapsulated in the plug body, the optics system including an optical surface that is substantially flush with the end face of the plug body such that the end face of the plug body and the optical surface are substantially co-planar surfaces, the optics system including at least one optical element for coupling light between at least one end of at least one optical fiber of the cable and an optics system of the receptacle.

2. The thin hybrid plug of claim 1, wherein said at least one electrical contact portion extends in a direction that is substantially parallel to the Y-axis in a direction away from and substantially normal to the X-Z plane, and wherein the optical surface has an X-axis dimension that is equal to or greater than about 1 mm.

3. The thin hybrid plug of claim 2, wherein the optical surface has an X-axis dimension that is between about 6 mm and about 8 mm.

4. The thin hybrid plug of claim 2, wherein the electrical contacts system includes at least first and second electrical contact portions that extend away from the end face of the plug body in directions that are substantially normal to the X-Z plane in which the end face lies and that are substantially parallel to the Y-axis, and wherein the optical surface is located in between the first and second electrical contact portions.

5. The thin hybrid plug of claim 2 further comprising a mechanical portion that extends away from the end face of the plug body in a direction that is substantially normal to the X-Z plane in which the end face of the plug lies and that is substantially parallel to the Y-axis, and wherein the optical surface is located in between the mechanical portion and the electrical contact portion.

6. The thin hybrid plug of claim 2, wherein said at least one electrical contact portion and the optical surface are located adjacent one another on the X-axis.

7. The thin hybrid plug of claim 2, wherein the optical system of the plug includes at least first and second optical surfaces, and wherein said at least one electrical contact portion is located in between the first and second optical surfaces, and wherein said at least one electrical contact portion extends away from the end face of the plug body in a direction that is substantially normal to the X-Z plane in which the end face of the plug lies and that is substantially parallel to the Y-axis.

8. A thin hybrid receptacle configured to mate with a hybrid plug, the receptacle comprising:
   a receptacle housing;
   an optics system mounted in the receptacle housing, the optics system having an end face that is disposed to be in close proximity to, or in contact with, an optical surface of an optics system of the hybrid plug that is flush and coplanar with an end face of the hybrid plug when the hybrid plug is mated with the hybrid receptacle; and
   a circuit board mounted in the receptacle housing, the circuit board having at least a first electrical contact portion that is configured to electrically couple with a first electrical contact portion of the hybrid plug within the receptacle housing when the hybrid plug is mated with the hybrid receptacle.

9. A thin connector assembly comprising:
   a thin hybrid plug comprising:
      a plug body having a first side configured to be attached to an end of a cable and a second side being configured to engage a receptacle;
      an electrical contacts system at least partially encapsulated in the plug body, the electrical contacts system including at least one electrical contact portion that extends away from an end face located on the second side of the plug body in a direction that is generally normal to the end face of the plug body, said at least one electrical contact portion being coupled to ends of electrical wires of the cable; and
      an optics system at least partially encapsulated in the plug body, the optics system including an optical surface that is substantially flush with the end face of the plug body such that the end face of the plug body and the optical surface are substantially co-planar surfaces, the optics system including at least one optical element for coupling light between at least one end of at least one optical fiber of the cable and an optics system of the receptacle; and
   a thin hybrid receptacle configured to mate with the hybrid plug, the receptacle comprising:
      a receptacle housing;
      an optics system mounted within the receptacle housing, the optics system having an end face that is in close proximity to, or in contact with, the optical surface of the optics system of the hybrid plug when the hybrid plug is mated with the hybrid receptacle; and
      a circuit board mounted within the receptacle housing, the circuit board having at least a first electrical contact portion that is configured to electrically couple with the first electrical contact portion of the hybrid plug when the hybrid plug is mated with the hybrid receptacle.

10. The thin connector assembly of claim 9, wherein the end face of the plug body lies in an X-Z plane of a Cartesian Coordinate System defined by an X-axis, a Y-axis and a Z-axis, wherein the X-axis, the Y-axis and the Z-axis are orthogonal to one another, and wherein said at least one electrical contact portion extends in a direction that is substantially parallel to the Y-axis in a direction away from and substantially normal to the X-Z plane, and wherein the optical surface has an X-axis dimension that is equal to or greater than about 1 millimeter (mm).

11. The thin connector assembly of claim 10, wherein the optical surface has an X-axis dimension that is between about 6 mm and about 8 mm.

12. The thin connector assembly of claim 10, wherein the electrical contacts system of the plug includes at least first and second electrical contact portions that extend away from the end face of the plug body in directions that are substantially normal to the X-Z plane in which the end face lies and that are substantially parallel to the Y-axis, and wherein the optical surface is located in between the first and second electrical contact portions.

13. The thin connector assembly of claim 10 further comprising a mechanical portion that extends away from the end face of the plug body in a direction that is substantially normal to the X-Z plane in which the end face of the plug lies and that is substantially parallel to the Y-axis, and wherein the optical surface is located in between the mechanical portion and the electrical contact portion.

14. The thin connector assembly of claim 10, wherein said at least one electrical contact portion and the optical surface are located adjacent one another on the X-axis.

15. The thin connector assembly of claim 10, wherein the optical system of the plug includes at least first and second optical surfaces, and wherein said at least one electrical contact portion is located in between the first and second optical surfaces, and wherein said at least one electrical contact portion extends away from the end face of the plug body in a direction that is substantially normal to the X-Z plane in which the end face of the plug lies and that is substantially parallel to the Y-axis.

16. A method for configuring a hybrid plug so that an optical surface of the plug can be easily cleaned, the method comprising:
providing a plug body having a first side configured to be attached to an end of a cable and a second side being configured to engage a receptacle, the second side including an end face wherein the end face of the plug body lies in an X-Z plane of a Cartesian Coordinate System defined by an X-axis, a Y-axis and a Z-axis, wherein the X-axis, the Y-axis and the Z-axis are orthogonal to one another, the plug body having an electrical contacts system at least partially encapsulated therein, the electrical contacts system including at least one electrical contact portion that extends away from the end face of the plug body in a direction that is generally normal to the end face of the plug body, said at least one electrical contact portion being coupled to ends of electrical wires of the cable, said at least one electrical contact portion having a Z-axis dimension that is about 2.45 millimeters (mm), the plug body having an optics system at least partially encapsulated therein, the optics system including an optical surface that is substantially flush with the end face of the plug body such that the end face of the plug body and the optical surface are substantially co-planar surfaces, the optics system including at least one optical element for coupling light between at least one end of at least one optical fiber of the cable and an optics system of the receptacle.

17. The method of claim 16, wherein said at least one electrical contact portion extends in a direction that is substantially parallel to the Y-axis in a direction away from and substantially normal to the X-Z plane, and wherein the optical surface has an X-axis dimension that is equal to or greater than about 1 mm.

18. The method of claim 17, wherein the optical surface has an X-axis dimension that is between about 6 mm and about 8 mm.

19. The method of claim 17, wherein the electrical contacts system includes at least first and second electrical contact portions that extend away from the end face of the plug body in directions that are substantially normal to the X-Z plane in which the end face lies and that are substantially parallel to the Y-axis, and wherein the optical surface is located in between the first and second electrical contact portions.

20. The method of claim 17, wherein the plug body further includes a mechanical portion that extends away from the end face of the plug body in a direction that is substantially normal to the X-Z plane in which the end face of the plug lies and that is substantially parallel to the Y-axis, and wherein the optical surface is located in between the mechanical portion and the electrical contact portion.

21. The method of claim 17, wherein said at least one electrical contact portion and the optical surface are located adjacent one another on the X-axis.

22. The method of claim 17, wherein the optical system of the plug includes at least first and second optical surfaces, and wherein said at least one electrical contact portion is located in between the first and second optical surfaces, and wherein said at least one electrical contact portion extends away from the end face of the plug body in a direction that is substantially normal to the X-Z plane in which the end face of the plug lies and that is substantially parallel to the Y-axis.

* * * * *